Figure 6:
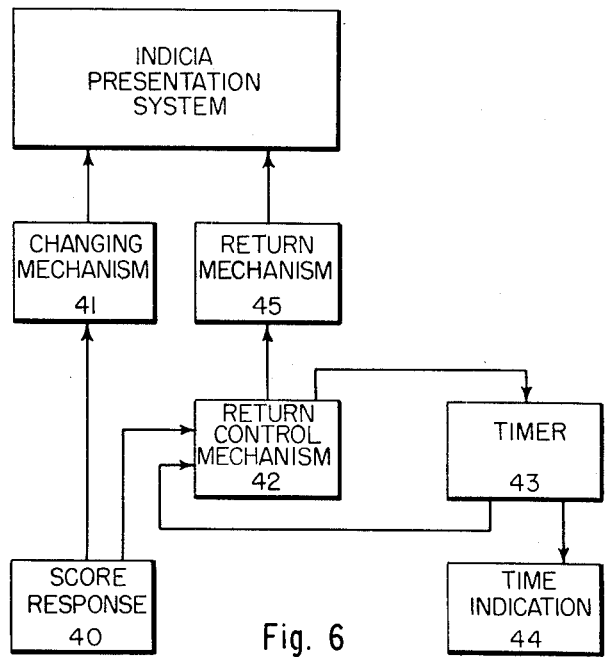

Re. 24722
Feb. 7, 1956   F. W. STERNER ET AL   2,733,923
SEQUENCE PRESENTATION DEVICE
Filed Nov. 24, 1951   3 Sheets—Sheet 1
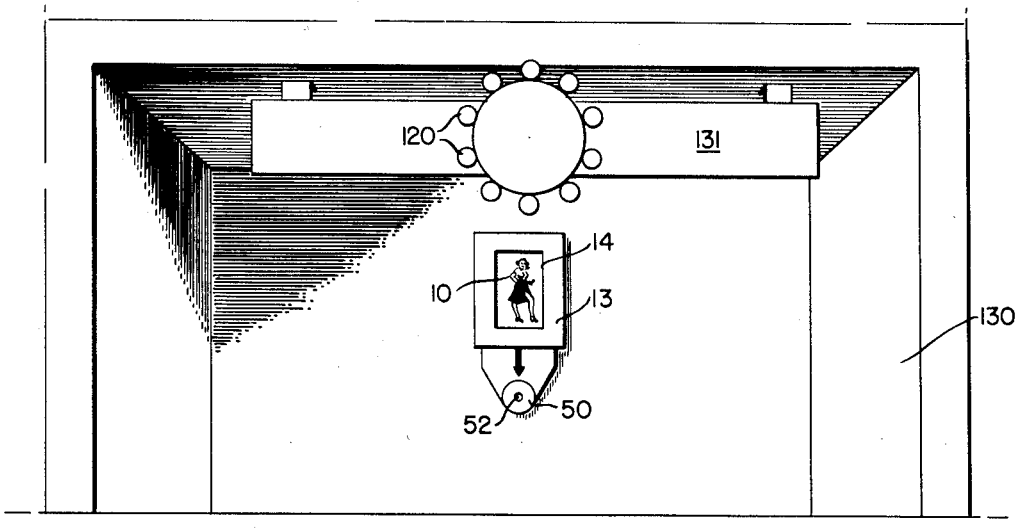
Fig. 1
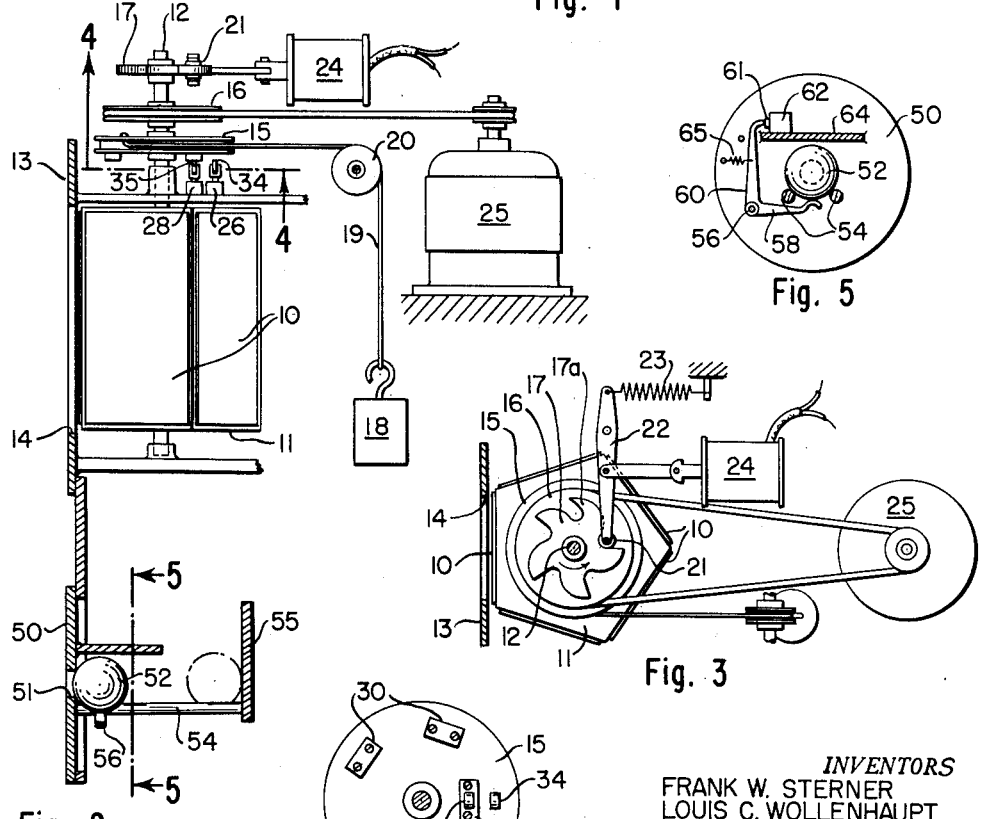
Fig. 2   Fig. 3   Fig. 4   Fig. 5
INVENTORS
FRANK W. STERNER
LOUIS C. WOLLENHAUPT
WILLIAM J. WOLLENHAUPT, JR.
BY 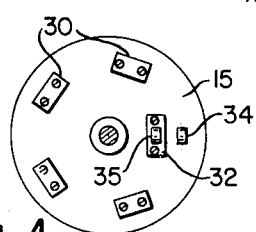
ATTORNEYS

INVENTORS
FRANK W. STERNER
LOUIS C. WOLLENHAUPT
WILLIAM J. WOLLENHAUPT, JR.

BY
ATTORNEYS

United States Patent Office 2,733,923
Patented Feb. 7, 1956

2,733,923

SEQUENCE PRESENTATION DEVICE

Frank W. Sterner, Littleton, William J. Wollenhaupt, Jr., Revere, and Louis C. Wollenhaupt, Winthrop, Mass., said William J. Wollenhaupt, Jr., and said Louis C. Wollenhaupt, assignors to said Sterner.

Application November 24, 1951, Serial No. 258,078

5 Claims. (Cl. 273—102.2)

This invention relates to score indicating systems associated with amusement devices. More particularly it consists in a score indicating system responsive to each successful attempt by the participant to accomplish the aim of the device, wherein score indicia are presented to view in a predetermined sequential order.

Amusement devices with which this invention may be associated include shooting gallery targets and other missile controlled devices, pin ball machines, electrically operated simulated shooting devices, and like devices wherein score means responsive to the operation thereof according to a predetermined standard are employed. The present invention provides a score indicating system which is actuated by said score responsive means of the amusement device, and which presents the successive score indicia each time the operator scores. It further provides reset mechanism to return the score indicia to the initial position so that the operation of the device may be repeated. In the preferred embodiment provision is made to reset the score indicia a predetermined period of time after a participant commences operation of the device, and in this embodiment means may be provided to indicate to the participant the passage of the limiting time period.

For purposes of illustration this invention is described below in greater detail as it relates to a shooting gallery target, wherein the score indicating system is actuated by the response of the bullseye to the impact of the bullet.

In general, this invention comprises a series of score indicia, means for separately presenting each of them to view successively, indicia changing mechanism responsive to each hit of the bullseye, and reset mechanism for returning the indicia to their initial position. The score indicia may consist of any sort of views, pictorial representations, figures, numerals or the like serially arranged, such as adjacently disposed along a strip or around the periphery of a disk or on the lateral surfaces of a drum, or in any other system whereby their proper sequence may be preserved. In a preferred embodiment the score indicia comprise successive views of a skit, so that the complete series of views presents the skit pictorially.

The indicia may be presented to view by any of a number of well known means. For instance they may be placed on a transparency in a projector and projected upon a screen, or they may be carried on adjacently disposed panels which may be presented one at a time from within a frame, as by mounting the panels around a drum which may be rotated within the frame, or by mounting them adjacently on a strip carried between rollers to progress across the frame.

The changing mechanism is provided to advance the indicia carriers at the proper instant, thereby to bring the next successive one into view. This mechanism is actuated each time a score is made, as when the bullseye is hit. It may force the indicia carriers to progress one at a time, or may comprise an escapement device to release the indicia carriers to allow them to advance under some biasing force, and hold them after each successive view is presented. Actuation of the changing mechanism is through a connection with the score responsive means, as the bullseye, and the precise nature of this connection depends largely on the nature of the response and of the changing mechanism. It is contemplated that in most cases the response will be relayed by an electrical circuit, and that the changing mechanism will be electrically operated. However, mechanical responses are also envisaged wherein mechanical actuation of the changing mechanism may be employed.

The indicia carriers are further controlled by resetting mechanism which is provided to return the carriers to the initial position for repeated operation of the device. The resetting mechanism may comprise any of a number of return mechanisms for returning the indicia carriers to their initial position after displacement thereof by the changing mechanism, and return control mechanism for actuating the return mechanism at the proper time, as after the passage of a predetermined period of time from the instant a participant begins operation of the device, and for inactivating the return mechanism during the operational period, so that the series of indicia carriers may be presented to view without immediate resetting thereof.

When resetting is controlled to occur a predetermined period of time after a participant begins operation, means are preferably provided to indicate visually the passage of the period of time. For this purpose a time indicator may conveniently be associated with the reset control mechanism.

Figure 8:
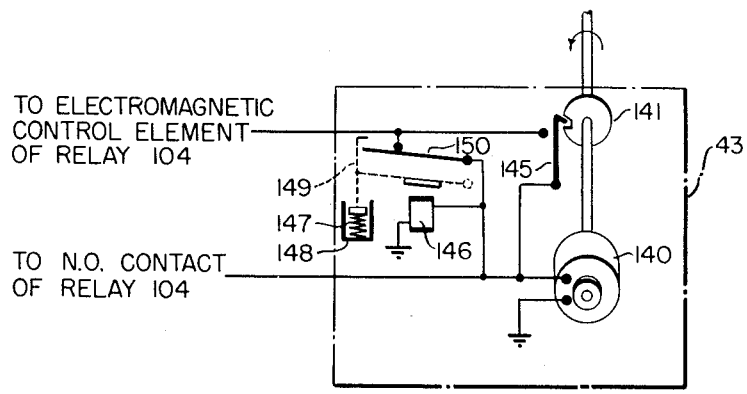
Figure 7:
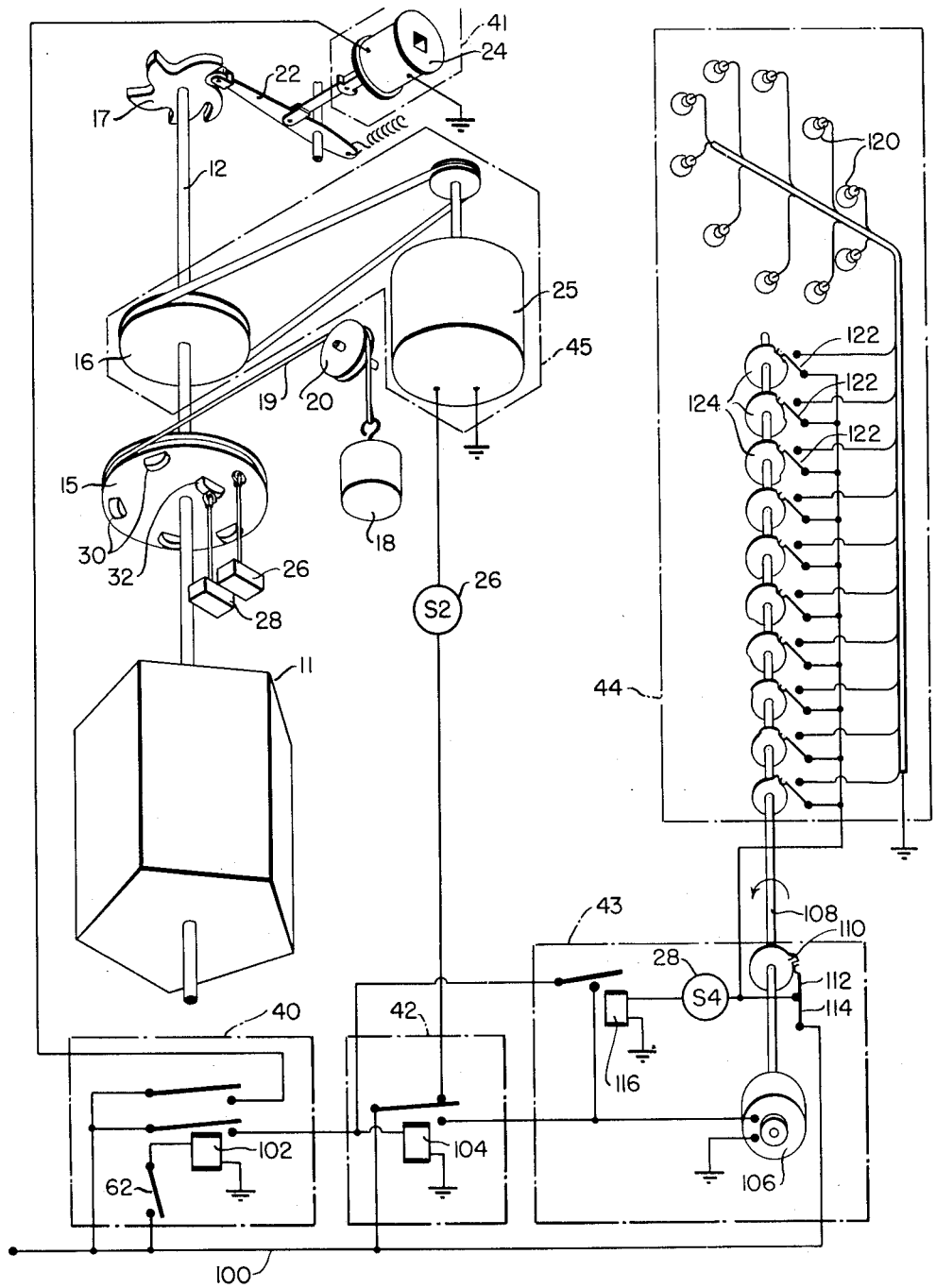

This invention will be more fully appreciated and understood from the following description of a preferred embodiment thereof, selected for purposes of illustration, and from the accompanying drawings in which:

Fig. 1 is a perspective view of a shooting gallery containing a device incorporating this invention, Fig. 2 is a side elevation showing diagrammatically the mechanical elements of one embodiment of this invention, Fig. 3 is a top view of the apparatus shown in Fig. 2, Fig. 4 is a view of a preferred switch operating arrangement taken at section 4—4 of Fig. 2, Fig. 5 is a view of a preferred target for translating scores into electrical impulses taken at section 5—5 of Fig. 2, Fig. 6 is a schematic block diagram of the control system of this invention, Fig. 7 is a diagrammatic circuit diagram showing controlled mechanical elements of an embodiment of this invention, Fig. 8 shows schematically a timing system alternative to that shown in Fig. 7.

Before proceeding with a detailed description of the apparatus of this invention we shall first discuss briefly the general organization thereof. The indicia are mounted for individual serial presentation to view, and are controlled as to position by the changing mechanism and return mechanism. Both of these mechanisms are controlled by the target (score response) to be actuated in the desired manner from impulses which result from a response of the target caused by a hit thereof. At the initial presentation position, when the first indicia is in view, the apparatus is in a normal rest condition. When the target is first hit, the responsive impulse therefrom causes actuation of the changing mechanism, and, through the return control mechanism, inactivation of the return mechanism. Thereby the next indicia is presented to view. The response from the target not only actuates the return control mechanism to deenergize the return mechanism, but also causes actuation of a timer control for the return control mechanism. The timer control, when thus actuated, maintains deenergization of the return mechanism for a predetermined period of time, at the end of which it provides a second actuation of the return control mechanism to energize the return mechanism thus to cause resetting of the indicia to their initial presentation position and return the apparatus to its normal rest condition. During the period of the timer, successive hits of the target cause repeated operation of the changing mechanism, and the resulting presentation of the various views in series.

In the illustrated embodiment of this invention the score indicia comprise the successive views of a burlesque sequence. The views are carried by the faces 10 of a pentagonal prism drum 11 which is mounted on a shaft 12 for axial rotation behind a bulletproof frame 13 having an opening 14 through which each one of the views may be seen. The shaft 12 extends upward from the top of the drum 11 and carries keyed thereto a drive pulley 15, a return pulley 16 and a ratchet wheel 17 having five teeth, one corresponding to each view presentation position of the pentagonal drum 11.

Each successive view carried by the drum 11 is presented within the opening by rotating the drum one fifth of a revolution.

Controlled rotation of the drum is provided by a weight 18 secured to one end of a drive line 19 which passes over an idler pulley 20 then around the drive pulley 15 to which the other end is secured. A pawl 21 engages the ratchet wheel 17 and provides a means of stopping and holding the drum at one fifth revolution intervals for the presentation of each view within the opening. The pawl 21 and ratchet wheel 17 are so situated that at each stop position one view-carrying face of the drum is exposed to view. The ratchet tooth 17a which corresponds to the presentation of the last view of the series is provided with a reentrant configuration which prevents withdrawal of the pawl and continued rotation of the drum.

The pawl 21 is carried by a lever 22 which is pivotally mounted so that the pawl 21 may be withdrawn from locking engagement with the ratchet teeth. A spring 23 fastened to the lever 22 provides a force which urges the pawl 21 into locking engagement with the ratchet teeth, and a solenoid 24 engaging the lever 22 in opposition to the spring 23 is provided to effect the withdrawal of the pawl 21 from the ratchet teeth.

The return pulley 16 is belted to a return motor 25 which is operated to return the drum to its initial position at the proper instant.

Mounted below the drive pulley 15 are a normally open switch 26 and a normally closed switch 28 whose functions are described below. The bottom surface of the drive pulley 15 is provided with four dogs 30 arranged in an arc concentric with the axis of the drum and pulley. The dogs are spaced to engage the normally open switch 26 to close it, at each stop position of the drum except the initial stop position (the stop position corresponding to the presentation of the first view of the series—the reset position). The switch 26 is situated in the power line to the return motor 25. Thus whenever the drum is in any stop position other than the initial stop position, the switch is closed by one of the dogs 30, and power may be supplied to the motor 25. It will be seen that power is supplied to the motor 25 for only a short interval, until the dog 30 holding the switch 26 closed is rotated away from the switch, thus allowing it to open. Each dog is of length sufficient to hold the switch 26 closed long enough for the system to acquire enough momentum, through the operation of the motor 25, to carry it to or slightly beyond the next preceding stop position, where the next dog 30 again closes the switch 26. The dog should not be of such a length that the switch 26 is closed long enough for the system to receive an amount of momentum sufficient to carry it two stop positions, for then the drum 11 would fail to come to rest at the initial stop position corresponding to which there is no dog to close the switch 26. A separate dog 32 is mounted on the drive pulley to engage the normally closed switch 28 and open it when the drum is in the initial stop position, while allowing it to close when the drum is caused to rotate from the initial stop position. The switches 26 and 28 are of the push button type, and are provided with roller arm actuaters 34, 35 respectively which engage and are depressed by the dogs 30 and 32. During engagement with the dogs the switches are actuated from their normal position.

The foregoing description is of the means by which the score indicia are presented to view, and also of the indicia changing mechanism and the return mechanism of the reset mechanism. It is contemplated that a multitude of modifications thereof will be obvious to those skilled in the art and such modifications may be adopted without departing from the scope of this invention.

The operation of the score indicia presentation system of the type just described, through the interrelated operation of the indicia changing mechanism and return mechanism is provided by a control system shown schematically in the block diagram of Fig. 6. By this system score response signals from a score responsive means 40 are directed to a changing mechanism 41 and to a return control mechanism 42, as indicated by the arrowed lines. A signal is simultaneously directed to a timer 43, shown as originating at the return control mechanism 42. The timer 43 is adapted to supply a signal back to the return control mechanism 42, as indicated by the arrowed line leading from the timer to the return control mechanism, and also controls the operation of a time indicator 44. The return mechanism 45 is controlled by the return control mechanism 42, which is in turn controlled by the score response 40 and timer 43.

The characteristics of these various units of the control system are as follows:

Score response 40—provides actuating impulses adapted to actuate the changing mechanism 41 and the return control mechanism 42, each time the participant scores on the amusement device.

Changing mechanism 41—provides a means for changing the score indicia upon signal from the score response 40. The changing mechanism in the embodiment described above comprises the solenoid 24, and causes indicia to change through the operation of the pawl 21 and ratchet wheel 17.

Return control mechanism 42—provides controlled energization of the return mechanism 45 so as to de-energize the return mechanism upon signal from the score response 40, and maintain the return mechanism de-energized upon signal from the timer 43. In the illustrated embodiment the signal to and resulting actuation of the timer 43 is relayed through the return control mechanism upon actuation thereof by the score response 40 and upon de-energization of the return mechanism.

The return control mechanism conveniently includes a power switch for the return mechanism, means associated with the score response 40 for opening said switch and means associated with the timer 43 for holding said switch open during the passage of the period of time measured by the timer.

Timer 43—provides a time measuring system which is actuated on a signal originating at the score response, and provides further a control signal to the return control mechanism 42 at the end of the time peroid. It also controls the time indicator 44.

Time indicator—presents to the participant intelligence as the passage of the period of time measured by the timer 43.

Return mechanism—returns the indicia to their initial position upon energization thereof by the return control mechanism 42. In the embodiment described above the return mechanism consists of the electric motor 25 belted to the return pulley 16, and zeroing control means described below.

The indicia presentation system shown in the schematic diagram of Fig. 6 comprises the mechanism whereby the series of score indicia are presented. In the embodiment described above it comprises essentially the pentagonal drum 11 carrying the indicia on its faces 10, in combination with the frame 13.

The operation of this control system is as follows:

When the participant first scores, as by hitting the bullseye of the target, a score response signal from the score response 40 is sent to the changing mechanism 41 whereby the next indicia is presented to view by the presentation system. Simultaneously a signal is sent to the return control mechanism 42 and to the timer 43. In the illustrated embodiment the signal to the timer 43 is relayed through the return control mechanism 42, but systems are contemplated wherein the signal is sent directly to the timer from the score response 40.

The signal to the return control mechanism 42 actuates it to provide and maintain de-energization of the return mechanism 45. The signal to the timer 43 actuates it to begin measurement of the desired time peroid. The time indicator 44, controlled by the timer 43 is then also placed in operation.

Successive scores made by the participant similarly cause actuation of the changing mechanism 41 through the score response 40. Signals from the score response 40 on such successive scores, to the return control mechanism 42 are ineffective since the result of such signals, namely deactivation of the return mechanism 45, has occurred upon the first score.

At the end of the interval of the timer 43 the return control mechanism 42 is actuated by the timer 43 again to energize the return mechanism 45 whereupon the indicia are reset to their original position and the device is in condition for a repeated operation, upon the next score and actuation of the score response 40.

In a shooting gallery target device, the score response signal is conveniently provided through target mechanism shown in Figs. 2 and 5. The target consists of a face plate 50 having a central aperture 51 or bullseye. A steel ball 52 is supported on the rear side of the face plate 50 in alignment with the aperture, on a pair of rails 54 which are slightly upwardly inclined. A bell crank designated generally as 56 having one horizontal arm 58 extending at its end upward between the rails 54 and in contacting relation with the ball 52 is pivotally mounted at one side of the rails. The other vertical arm 60 of the bell crank 56 extends upward and contacts the button 61 of a normally closed push button switch 62. The bell crank 56 is so situated that the ball 52 normally rests on the arm 58 thus holding the vertical arm 60 against the button 61 to maintain the switch 62 open. When the bullseye is struck the ball is caused to roll along the rails and off the horizontal arm 58 of the bell crank 56 whereupon the push button 61 of the switch 62 is released and the switch is closed until the ball returns down the rails and again rests on the arm 58 and opens the switch 62. The switch 62 is conveniently situated above a protective partition 64 which shields it from spattering lead. A spring 65 may be provided to urge the bell crank 56 to switch closing position. A stop plate 55 is mounted across the rails 54 to prevent the ball from rolling off their ends.

A preferred simple electrical system corresponding to the schematic outline of Fig. 6 is shown in Fig. 7, with the various units described above outlined by dot-dash lines and correspondingly numbered. Electrical power is supplied between a common power line 100 and a common ground represented by the conventional symbol. The power is described as flowing from the power line 100 to the various circuit elements, and it will be understood that each of said elements is appropriately grounded as indicated, thus completing each circuit through the elements.

When the bullseye is struck with a bullet the switch 62 closes momentarily as the ball 52 is displaced from its rest position. The switch 62 is situated in a power line leading to the electromagnetic control element of a normally open double pole single throw score response relay 102. Both poles of the relay 102 are connected to the power line 100 and the contact terminals are connected respectively to the solenoid 24 of the changing mechanism 41 and to the electromagnetic control element of a single pole double throw relay 104 having one normally closed contact and one normally open contact. The pole of this relay is connected to the power line 100. The normally closed contact leads to the motor 25 of the return mechanism 45 through the normally open switch 26. The normally open contact leads to the timer 43. The relay 104 comprises the return control mechanism 42.

The timer consists of a driving element 106 such as a low speed motor, having a shaft 108 on which is keyed a cam 110. The cam follower 112 comprises the actuating arm of a normally closed switch 114, and the cam 110 is so shaped that the switch is opened for a short instant once each revolution. The cam 110 is driven by the driving element 106 to make one revolution per timer cycle, with the switch 114 being opened at the end of the cycle. The driving element 106 is designed to overrun a slight amount at the end of the cycle for the reason explained below.

The cam switch 114 is connected between the power line 100 and the electromagnetic control element of a normally open single pole single throw holding relay 116, there being situated in the lead between the cam switch 114 and the holding relay 116 the normally closed switch 28.

The normally open contact of the return control relay 104 leads to the timer driving element 106. A holding circuit is provided between this normally open contact of the return control relay 104 and the electromagnetic control element thereof through the switch element of the holding relay 116.

The time indicator 44 comprises a circular array of lights 120 each of which is connected to the power line through one of a series of cam operated switches 122 and also through the cam switch 114. The switches 122 are actuated by a series of cams 124 mounted on the shaft 108 of the timer driving element 106. These cams 124 are so positioned and shaped that the light switches 122 are successively closed as the cams rotate, each switch upon closing remaining closed thereafter until the timer cycle is completed. The light switches 122 are connected to the circular array of lights 120 in such a manner that they light up serially each one following the adjacent one by a more or less even time interval.

A typical arrangement of shooting gallery apparatus incorporating this invention is shown in Fig. 1. The frame 13 is suitably mounted near the rear of the gallery 130 with the target plate 50 mounted beneath it. The face 10 of the drum corresponding to the initial stop position is exposed to view through the opening 14 of the frame 13. Above the frame 13 is mounted the circular array of lights 120, conveniently on a casing 131 which contains the timer motor 106 and the shaft 108 thereof along with the cams 110 and 124 and switches 114 and 122.

A participant operates the amusement device of this invention by attempting to hit the steel ball bullseye 52 of the target 50 with a missile from a firearm. When the bullseye is first struck the steel ball 52 is propelled back along the rails 54, thus releasing the bell crank 60 to permit the switch 62 to close. When this happens the relay 102 is energized to close the two switches thereof. Power is thereby supplied to the solenoid 24 and to the relay 104. The operation of solenoid 24 through the lever arm 22 causes the withdrawal of the pawl 21 from the ratchet wheel 17 whereupon the force of the weight 18 operating through the drive pulley 15 causes the drum 11 to rotate. The closing of switch 62 is for short duration, so that the resulting operation of the solenoid 24 results in a quick return of the pawl to engaging relation with the ratchet wheel 17 before the drum rotates to present its next side to view. The inclination of the rails 54 is accordingly adjusted to return the ball 52 to its rest position after the drum rotates from its initial stop position and before it has rotated a fifth of a revolution. After rotation of one fifth of a revolution the pawl 21 engages the next tooth of the ratchet wheel and holds the drum with the next side exposed to view through the opening 14 in the frame 13.

When the drum 11 rotates from its initial stop position the switch 28 is allowed to close after having been held open by the dog 32. Thereupon the holding relay 116 is energized to close the switch associated with it. Simultaneously with the power impulse to the solenoid 24 is the actuation of relay 104. When relay 104 is actuated power is supplied to the timer motor 106, and, when the drum rotates from its initial stop position and switch 28 closes, power is also supplied through the holding relay switch 116 to the electromagnetic control element of the relay 104, thereby holding relay 104 in the actuated position.

The timer motor 106 then drives the cams 124 thereby closing the switches 122 in succession, whereupon the lights 120 are illuminated progressively to indicate the passage of time to the participant.

Each time the participant thereafter strikes the bullseye, the closing of the switch 62 causes the operation of the solenoid 24 and the presentation of the next face of the drum 11. Impulses simultaneously sent through the relay 102 to the return control relay 104 are ineffective since this latter relay is already actuated. If the participant is skillful enough to present to view each of the sides of the drum 11, the last score indicia will be shown when the pawal 21 engages the last tooth 17a of the ratchet wheel 17. The reentrant configuration of this tooth 17a engages the pawl 21 and prevents withdrawal thereof. Repeated hits of the bullseye are thus ineffective to result in continued rotation of the drum 11.

At the end of the timer cycle, when the shaft 108 and accompanying cams 110 and 124 have nearly completed one revolution, the cam 110 opens the switch 114, thus de-energizing the holding relay 116 and opening the holding circuit of the return control relay 104. When this occurs the timer motor 106 is de-energized and power is supplied by the return control relay 104 to the return motor 25 through the switch 26. If the drum 11 is in any position other than its initial position, switch 26 is closed, and the return motor is energized to drive the return pulley 16 and reset the drum to its initial stop position. At this position switch 26 remains open and prevents continued operation of the return motor 25.

The timer motor 106 continues to run for a short instant under the inertia of the system, thus allowing switch 114 to close again, to place the circuit in the same condition it was in prior to the first closure of switch 62 by the first hitting of the target. In this condition the switch 28 is open, thus preventing energization of the relay 116 when the device is not being operated. It will be recalled that this switch closes the instant the drum 11 is rotated from its initial stop position, so as to provide for immediate closing of the holding circuit through the relay 116, at the first closure of the switch 62.

In the foregoing embodiment the holding circuit is maintained as potentially closed by the closing of the switch 114 after the opening thereof. It will be understood that in this circuit a closed holding circuit must be provided the instant the switch 62 is first closed so that the timer motor 106 may be started and continued in operation. Inasmuch as the timer controlled cam switch, which controls the holding circuit, may remain open after the end of the timer cycle in some timer devices an initially closed circuit in parallel with the timer controlled switch may be provided. One such system is shown in Fig. 8. It will be assumed that in this system the timer motor 140 does not overrun, but stops instantly, thus placing the timer controlled switch 145 in the open position at the end of the timer cycle.

In the system shown in Fig. 8 the holding circuit is completed directly through the timer controlled switch 145, rather than through a relay controlled by the timer controlled switch as in the embodiment previously described. This switch 145 is actuated by a cam 141 driven by the timer motor 140, and closes shortly after the timer motor 140 is energized and opens after the cam 141 has been driven through one revolution.

To provide a closed holding circuit in the embodiment shown in Fig. 8, there is provided in parallel with the initially open timer controlled switch 145 a normally closed switch 150, and a delayed action actuating mechanism therefor, comprising for instance a solenoid actuator 146, lost motion switch opening mechanism 149 and damping means, such as a dashpot 148. A spring 147 is also provided to return the mechanism 149 after the solenoid actuator 146 is de-energized. When power is supplied to the timer motor 140, the holding circuit is instantly completed through the switch 150. Thereafter the cam 141 is driven by the timer motor 140 to close the switch 145. At the same time the solenoid actuator 146 provides a force which causes the switch opening mechanism 149 to be slowly displaced against the damping action of the dashpot 148. When the lost motion of the switch opening mechanism has been overcome the switch 150 is opened and remains open so long as the solenoid actuator is energized. The holding circuit is thereafter completed only through the cam operated switch 145, and when this switch opens the holding circuit is broken. The power to the motor 140 and to the solenoid actuator 146 is then interrupted and the switch opening mechanism 149 is returned to its normal position by the spring 147, thus allowing the switch 150 to close to place the holding circuit again in its initial condition.

The circuitry of the embodiment described above is designed to accommodate the particular circuit elements used therein. Modifications of the circuit to accommodate circuit elements different from those described above are believed to be obvious to those skilled in the art. For instance it is contemplated that one may desire to use a timer which, at the end of the time interval measured by it, responds in a manner other than by momentarily opening the normally closed contacts in a holding circuit. Such a timer would be incorporated in a circuit wherein the time period termination response is transformed to a response adapted to actuate the return control mechanism to the return mechanism energization condition. Any timer must also be provided with starting means actuated by the first operation of the score response, and the circuit therefor will also depend largely on the control features of the particular timer element selected.

Further obvious modifications of the circuit may also be considered desirable to adapt it for incorporation of other elements which may differ in construction from those described herein, or for dividing the function of one element among several elements. For instance the single pole double throw relay 104 may be replaced by a pair of single pole single throw relays having a common electromagnetic control circuit, one relay being normally closed and in the return mechanism circuit and the other being normally open and in the timer circuit. Such modifications may be made without departing from the scope of the invention.

Having thus disclosed this invention and described in detail a preferred embodiment thereof, it is desired to claim and secure by Letters Patent:

1. A controlled sequence presentation device comprising a plurality of indicia arranged in sequence for separate presentation, changing mechanism adapted to advance the indicia one at a time upon each actuation thereof to present the next one of the sequence, normally inactivated return mechanism adapted to return the indicia to their sequential origin, timer controlled means for actuating said return mechanism a predetermined period of time after the timer is started, operating means to actuate said changing mechanism and start said timer whereby on the first operation thereof said timer is started and the next indicia is presented and on each subsequent operation the next succeeding indicia is presented until termination of the period of the timer, and means inactivating said return mechanism upon return of the indicia to their sequential origin.

2. A controlled sequence presentation device comprising a plurality of indicia arranged in sequence for separate presentation, changing mechanism adapted to advance the indicia to present the next one of the sequence, return mechanism adapted to return the indicia to their sequential origin, control means for energizing and deenergizing said return mechanism, operating means for simultaneously actuating said changing mechanism and operating said control means to deenergize said return mechanism, and timer means responsive to said operating means adapted to maintain said control means in the deenergizing relation for a predetermined period of time after the first operation of said operating means, and to actuate said control means to energize said return mechanism at the end of said predetermined time interval.

3. A controlled sequence presentation device comprising a plurality of indicia mounted for individual presentation in sequence, electrically actuated changing mechanism adapted to advance the indicia to present the next one of the sequence, electrically driven return mechanism adapted to return the indicia to their sequential origin and a power lead thereto, control means including a normally closed switch in the power lead and electrically operated means for opening said switch, operating means for providing simultaneously an electrical impulse to actuate said changing mechanism and to operate said control means to open said switch, and timer means responsive to said operating means to maintain said switch open for a predetermined period of time after the first operation thereof.

4. A score indicating amusement device comprising a plurality of score indicia mounted for individual presentation in sequence; electrically actuated changing mechanism adapted to advance the indicia to present the next one of the sequence; electrically driven return mechanism adapted to return the indicia to their sequential origin; an electromagnetically operated switch having (1) a pole connected with a source of power, (2) a normally closed contact connected with said return mechanism and (3) a normally open contact; an electrically powered self-restoring timer connected to said normally open contact, said timer including circuit closing means for energizing said switch during the time interval of the timer; and score responsive means for providing simultaneously an electrical impulse to actuate said changing mechanism and electrical impulse to energize said switch.

5. A score indicating mechanism for amusement devices comprising a plurality of indicia mounted for individual sequential presentation, electrically actuated changing mechanism adapted to advance the indicia to present the next one of the sequence, electrically operated return mechanism adapted to return the indicia to their sequential origin, score responsive means for translating scores on the amusement device to electrical impulses, means for conducting an impulse from said score responsive means to said changing mechanism, and return mechanism control means comprising a power lead to said return mechanism and a normally closed switch therein, an electrically powered self-restoring timer, a power lead to said timer and a normally open switch therein, electromagnetic means for operating said switches, circuit closing means maintained closed by the timer during the time interval measured thereby, a holding circuit for said electromagnetic means said holding circuit including said circuit closing means, and means for conducting an electrical impulse from said score responsive means to said electromagnetic means, whereby at the first operation of said score responsive means said electromagnetic means is caused to actuate said switches from their normal position and said timer is started, and said switches are held in their actuated position while said circuit closing means completes the holding circuit during the interval of the timer; and at each operation of said score responsive means said changing mechanism is actuated.

References Cited in the file of this patent

UNITED STATES PATENTS

| | | |
|---|---|---|
| 848,477 | Michel | Mar. 26, 1907 |
| 1,267,722 | Walter | May 28, 1918 |
| 2,052,678 | Tigerman | Sept. 1, 1936 |
| 2,106,024 | Wood | Jan. 18, 1938 |
| 2,187,422 | Henry | Jan. 16, 1940 |